US010735189B2

(12) United States Patent
Wang et al.

(10) Patent No.: US 10,735,189 B2
(45) Date of Patent: Aug. 4, 2020

(54) DATA EXCHANGE FOR MULTI-PARTY COMPUTATION

(71) Applicant: Alibaba Group Holding Limited, George Town (KY)

(72) Inventors: Huazhong Wang, Hangzhou (CN); Lichun Li, Hangzhou (CN); Yuan Zhao, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/777,392

(22) Filed: Jan. 30, 2020

(65) Prior Publication Data
US 2020/0169399 A1 May 28, 2020

Related U.S. Application Data

(63) Continuation of application No. PCT/CN2020/071588, filed on Jan. 11, 2020.

(30) Foreign Application Priority Data
Jul. 1, 2019 (CN) .......................... 2019 1 0583548

(51) Int. Cl.
*H04L 9/08* (2006.01)
(52) U.S. Cl.
CPC ............ *H04L 9/0869* (2013.01); *H04L 9/083* (2013.01); *H04L 2209/46* (2013.01)
(58) Field of Classification Search
CPC .... H04L 9/0869; H04L 9/083; H04L 2209/46
(Continued)

(56) References Cited

U.S. PATENT DOCUMENTS 7,941,667 B2 * 5/2011 Miyazaki ................ G06F 21/64
713/176
10,230,524 B2 3/2019 Howell et al.
(Continued)

FOREIGN PATENT DOCUMENTS

CN 1885774 12/2006
CN 107210911 9/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Mohammad W Reza
(74) *Attorney, Agent, or Firm* — Fish & Richardson P.C.

(57) ABSTRACT

The present disclosure relates to exchanging data for multi-party computation. In some aspects, a server generates a first random number set, a second random number set, a third random number set, and a fourth random number set based on a first random seed, a second random seed, a third random seed, and a fourth random seed, respectively. The sever generates a fifth random number set and a sixth random number set, respectively, based on the first random number set, the second random number set, the third random number set, and the fourth random number set. The random numbers in the random number sets satisfy a predetermined condition. The server sends the first random seed, the second random seed, and the fifth random number set to a first device. The server sends the third random seed, the fourth random seed, and the sixth random number set to a second device.

15 Claims, 10 Drawing Sheets

(58) Field of Classification Search
USPC .......................................................... 380/279
See application file for complete search history.

(56) References Cited

U.S. PATENT DOCUMENTS

| | | | |
|---|---|---|---|
| 10,592,157 B2* | 3/2020 | Lin ..................... | G06F 3/0659 |
| 2003/0163718 A1 | 8/2003 | Johnson et al. | |
| 2009/0323942 A1* | 12/2009 | Sharon ................ | G11C 7/1006 |
| | | | 380/44 |
| 2017/0093557 A1* | 3/2017 | Doberstein ......... | H03M 13/154 |

FOREIGN PATENT DOCUMENTS

| | | |
|---|---|---|
| CN | WO2017193932 | 11/2017 |
| CN | 109255247 | 1/2019 |
| CN | 109446828 | 3/2019 |
| CN | 109525390 | 3/2019 |
| CN | 109615370 | 4/2019 |
| CN | 109951443 | 6/2019 |
| CN | 110460435 | 11/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/071588, dated Mar. 27, 2020, 17 pages (with machine translation).

* cited by examiner

DATA EXCHANGE FOR MULTI-PARTY COMPUTATION

CROSS-REFERENCE TO RELATED APPLICATIONS

This application is a continuation of PCT Application No. PCT/CN2020/071588, filed on Jan. 11, 2020, which claims priority to Chinese Patent Application No. 201910583548.6, filed on Jul. 1, 2019, and each application is hereby incorporated by reference in its entirety.

TECHNICAL FIELD

The present specification relates to the field of computer technologies, and in particular to data exchange multi-party computation.

BACKGROUND

Secure multi-party computation (MPC) is a cryptographic technology. By executing one MPC algorithm, a plurality of parties participating in computation can jointly perform secure computation based on their own input data, to obtain a computation result without leaking their own input data to the other parties.

MPC has been widely used in business practice. For example, in a cooperative security modeling scenario, for the sake of protecting data privacy, a plurality of data parties can cooperatively train a data processing model by using the MPC technology without leaking their own data.

SUMMARY

An objective of implementations of the present specification is to provide a data exchange method, apparatus, server, and electronic device, so as to reduce the number of random numbers sent by a random number server, thereby reducing network bandwidth occupation.

To achieve the previous objective, one or more implementations of the present specification provide the following technical solutions:

According to a first aspect of one or more implementations of the present specification, a data exchange method is provided, where the method is applied to the secure multi-party computation (MPC) field and includes the following: successively generating a first random number set, a second random number set, a third random number set, and a fourth random number set based on a first random seed, a second random seed, a third random seed, and a fourth random seed respectively; generating a fifth random number set and a sixth random number set respectively based on the first random number set, the second random number set, the third random number set, and the fourth random number set, where random numbers in the first random number set, the second random number set, the third random number set, the fourth random number set, the fifth random number set, and the sixth random number set satisfy a predetermined condition; sending the first random seed, the second random seed, and the fifth random number set to a first device; and sending the third random seed, the fourth random seed, and the sixth random number set to a second device.

According to a second aspect of one or more implementations of the present specification, a data exchange apparatus is provided, where the apparatus is applied to the MPC field and includes the following: a first generation unit, configured to successively generate a first random number set, a second random number set, a third random number set, and a fourth random number set based on a first random seed, a second random seed, a third random seed, and a fourth random seed respectively; a second generation unit, configured to generate a fifth random number set and a sixth random number set respectively based on the first random number set, the second random number set, the third random number set, and the fourth random number set, where random numbers in the first random number set, the second random number set, the third random number set, the fourth random number set, the fifth random number set, and the sixth random number set satisfy a predetermined condition; a first sending unit, configured to send the first random seed, the second random seed, and the fifth random number set to a first device; and a second sending unit, configured to send the third random seed, the fourth random seed, and the sixth random number set to a second device.

According to a third aspect of one or more implementations of the present specification, a server is provided, where the server includes the following: a memory, configured to store a computer instruction; and a processor, configured to execute the computer instruction to implement the method steps according to the first aspect.

According to a fourth aspect of one or more implementations of the present specification, a data exchange method is provided, where the method is applied to the MPC field and includes the following: receiving a first random seed, a second random seed, and a first random number set; and generating a second random number set and a third random number set based on the first random seed and the second random seed respectively, so that MPC is performed based on the first random number set, the second random number set, and the third random number set.

According to a fifth aspect of one or more implementations of the present specification, a data exchange apparatus is provided, where the apparatus is applied to the MPC field and includes the following: a receiving unit, configured to receive a first random seed, a second random seed, and a first random number set; and a generation unit, configured to generate a second random number set and a third random number set based on the first random seed and the second random seed respectively, so that MPC is performed based on the first random number set, the second random number set, and the third random number set.

According to a sixth aspect of one or more implementations of the present specification, an electronic device is provided, where the electronic device includes the following: a memory, configured to store a computer instruction; and a processor, configured to execute the computer instruction to implement the method steps according to the fourth aspect.

As can be seen from the technical solutions provided in the previous implementations of the present specification, in the implementations of the present specification, the random number server can send the first random seed and the second random seed to the first device, and can send the third random seed and the fourth random seed to the second device. The random number server sends the random seeds to the first device and the second device, thereby reducing the number of sent random numbers and reducing network bandwidth occupation.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

The following describes the technical solutions in the implementations of the present specification with reference to the accompanying drawings in the implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

Figure 1:
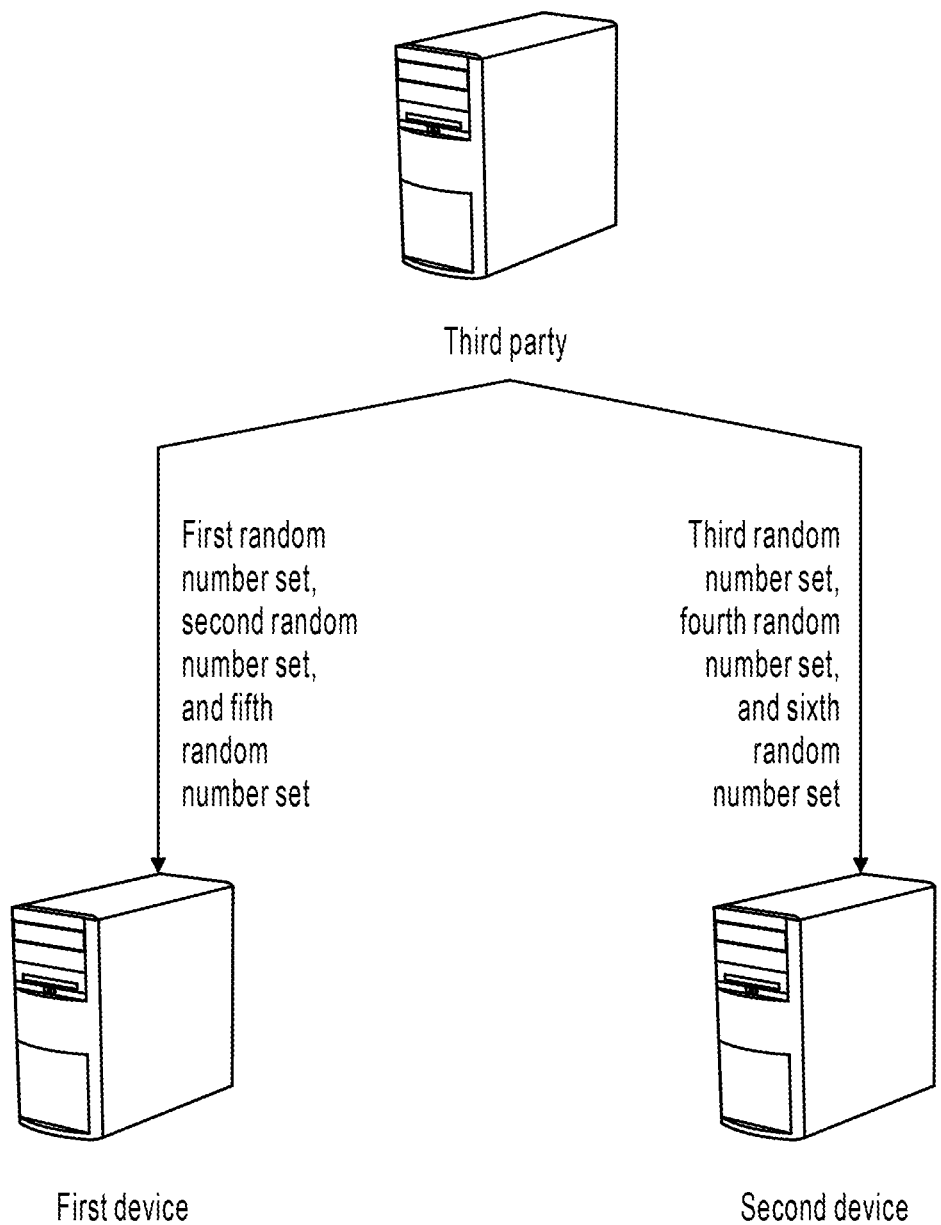
FIG. 1 is a schematic diagram illustrating a random number distribution method in a related technology.

References are made to FIG. 1. In the previous related technologies, a third party can generate a first random number set, a second random number set, a third random number set, a fourth random number set, a fifth random number set, and a sixth random number set. Each of the first random number set, the second random number set, the third random number set, the fourth random number set, the fifth random number set, and the sixth random number set can include at least one random number. Random numbers in the first random number set, the second random number set, the third random number set, the fourth random number set, the fifth random number set, and the sixth random number set can satisfy a predetermined condition.

The third party can send the first random number set, the second random number set, and the fifth random number set to a first device; and the third party can send the third random number set, the fourth random number set, and the sixth random number set to a second device. The first device can receive the first random number set, the second random number set, and the fifth random number set. The second device can receive the third random number set, the fourth random number set, and the sixth random number set. As such, the first device can perform secure multi-party computation (MPC) based on the first random number set, the second random number set, and the fifth random number set; and the second device can perform MPC based on the third random number set, the fourth random number set, and the sixth random number set. The third party needs to send the first random number set, the second random number set, and the fifth random number set to the first device; and needs to send the third random number set, the fourth random number set, and the sixth random number set to the second device. Consequently, the number of random numbers sent by the third party is large, and a large amount of network bandwidth is occupied.

MPC is an algorithm for protecting data privacy and data security. A plurality of participants can use the MPC technology to perform cooperative calculation to obtain a computation result without leaking their own data. For example, through MPC, participants $P_1, \ldots, P_n$ can cooperatively calculate the function $f(x_1, \ldots, x_n)=(y_1, \ldots, y_n)=y$, where $n \geq 2$; $x_1, \ldots, x_n$ represent data owned by the participants $P_1, \ldots, P_n$ respectively; y represents a calculation result; $y_1, \ldots, y_n$ represent shares of the participants $P_1, \ldots, P_n$ in the calculation result y respectively after the calculation.

MPC has been widely used in business practice. For example, in a cooperative security modeling scenario, for the sake of protecting data privacy, a plurality of data parties can cooperatively train a data processing model by using the MPC technology without leaking their own data.

Secret sharing (SS) is an algorithm that is used to implement MPC. An idea of the secret sharing algorithm is as follows: Secret information is split in an appropriate way; the shares obtained after splitting are managed by different participants; a single participant cannot restore the secret information; the secret information can only be restored through cooperation of more than one participants. For example, the participant $P_1$ owns data $x_1$ and the participant $P_2$ owns data $x_2$. By using the secret sharing algorithm, the participant $P_1$ and the participant $P_2$ can perform cooperative calculation to obtain a calculation result $y=y_1+y_2=f(x_1,x_2)=x_1x_2$. After the calculation, the participant $P_1$ can obtain a share $y_1$ of the calculation result y, and the participant $P_2$ can obtain a share $y_2$ of the calculation result y.

A random seed can be a random number that is used to generate a random number. The random seed can be either a true random number or a pseudo-random number. In practice, iteration is performed for a plurality of times by using a random number generation algorithm and using the random seed as an initial condition, to generate a plurality of corresponding random numbers.

Figure 2:
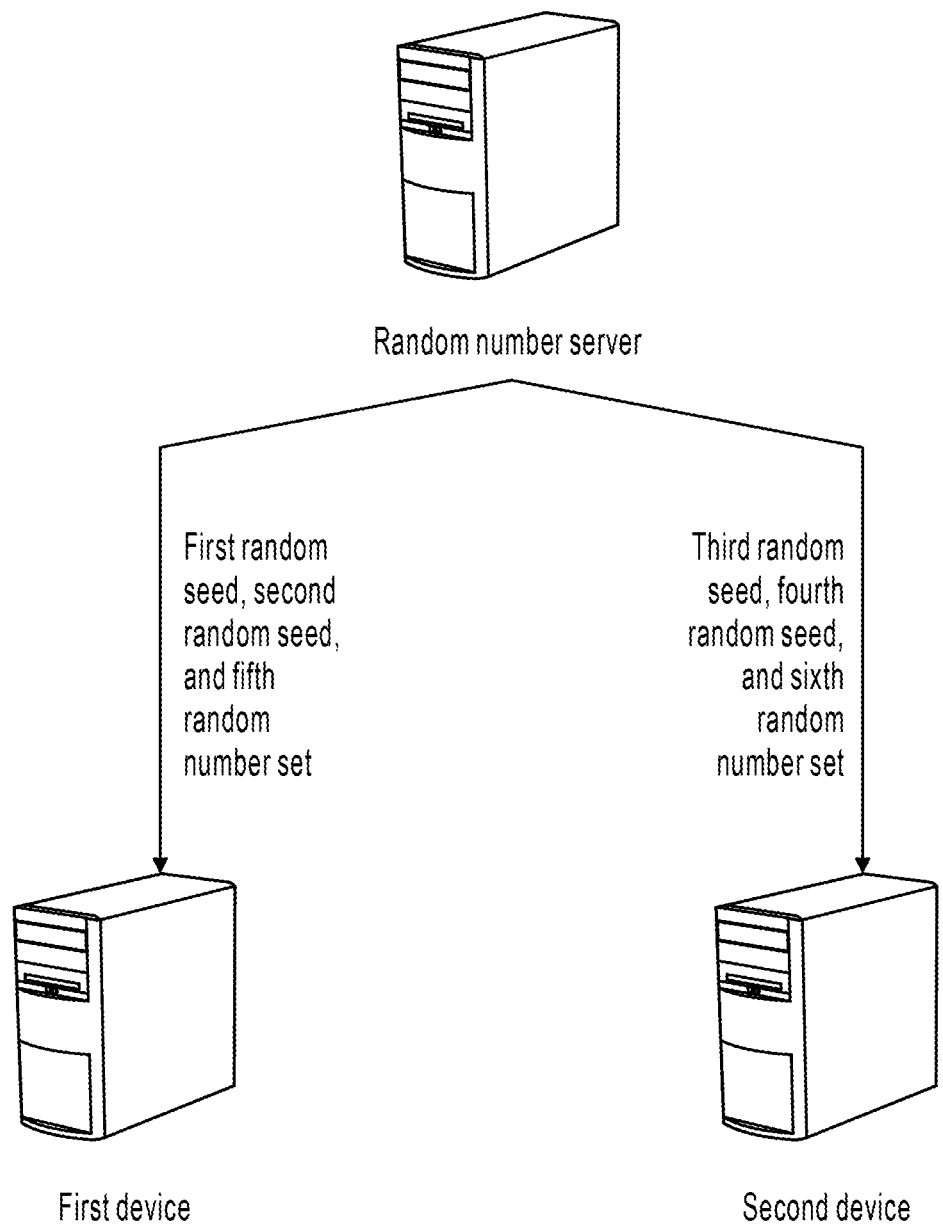
FIG. 2 is an architectural diagram illustrating a data processing system, according to an implementation of the present specification.

References are made to FIG. 2. The present specification provides an implementation of a data processing system.

In the implementation, the data processing system can include a random number server, a first device, and a second device.

The random number server can be a server, or a server cluster that includes a plurality of servers. As a trusted third party (TTP), the random number server is configured to separately send a random seed and a random number to the first device and the second device. The random number server can successively generate a first random number set, a second random number set, a third random number set, and a fourth random number set based on a first random seed, a second random seed, a third random seed, and a fourth random seed respectively. The random number server can generate a fifth random number set and a sixth random number set respectively based on the first random number set, the second random number set, the third random number set, and the fourth random number set, where random numbers in the first random number set, the second random number set, the third random number set, the fourth random number set, the fifth random number set, and the sixth random number set satisfy a predetermined condition. The random number server can send the first random seed, the second random seed, and the fifth random number set to the first device, and the random number server can send the third random seed, the fourth random seed, and the sixth random number set to the second device.

Each of the first device and the second device can be a device such as a server, a mobile phone, a tablet computer, or a personal computer, or can be a system that includes a plurality of devices, for example, a server cluster that includes a plurality of servers. The first device and the second device can be both parties participating in MPC. The first device can receive the first random seed, the second random seed, and the fifth random number set; and the first device can locally generate the first random number set and the second random number set based on the first random seed and the second random seed, respectively. The second device can receive the third random seed, the fourth random seed, and the sixth random number set; and the second device can locally generate the third random number set and the fourth random number set based on the third random seed and the fourth random seed, respectively. As such, the first device can perform MPC based on the first random number set, the second random number set, and the fifth random number set; and the second device can perform MPC based on the third random number set, the fourth random number set, and the sixth random number set.

Based on the same random seed, different implementation entities execute the same random number generation algorithm to obtain the same random number. Therefore, a random number generation algorithm can be agreed on among the random number server, the first device, and the second device. The random number generation algorithm can include the midsquare method, the linear congruential method, etc. As such, based on the first random seed, the random number server and the first device can obtain the same first random number set by executing the agreed random number generation algorithm. Similarly, the random number server and the first device can further obtain the same second random number set. The random number server and the second device can obtain the same third random number set and the same fourth random number set.

Figure 3:
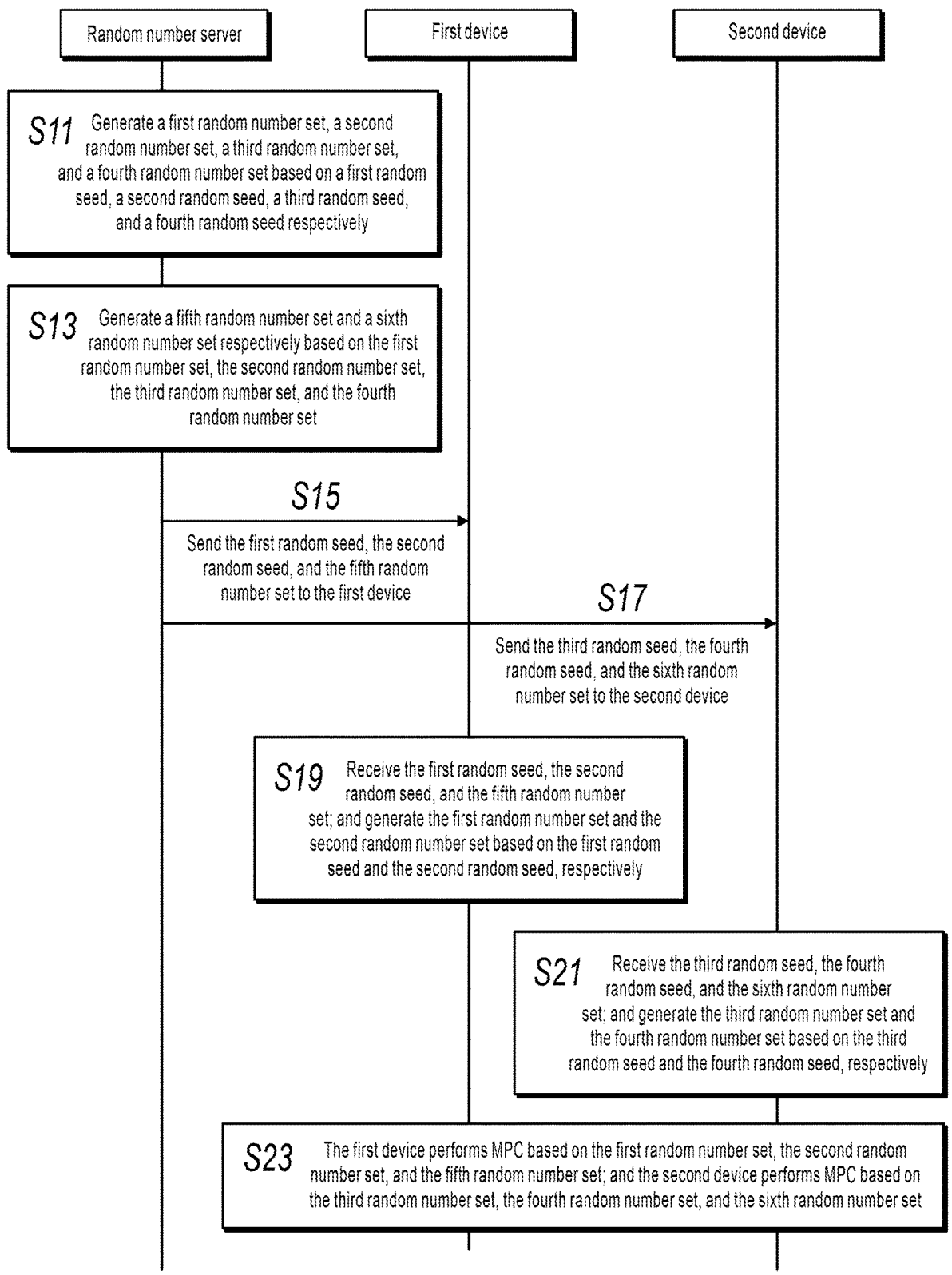
FIG. 3 is a flowchart illustrating a data exchange method, according to an implementation of the present specification.

The present specification further provides an implementation of a data exchange method. References are made to FIG. 3. The implementation can include the following steps.

S11: A random number server generates a first random number set, a second random number set, a third random number set, and a fourth random number set based on a first random seed, a second random seed, a third random seed, and a fourth random seed respectively.

In some implementations, the first random seed, the second random seed, the third random seed, and the fourth random seed are all MPC random seeds, and random numbers generated based on the MPC random seeds can be used to participate in MPC. The first random seed, the second random seed, the third random seed, and the fourth random seed can be generated by the random number server, or can be sent by other electronic devices, which is not limited in the present implementation. The first random seed can be used to generate a random number in the first random number set, the second random seed can be used to generate a random number in the second random number set, the third random seed can be used to generate a random number in the third random number set, and the fourth random seed can be used to generate a random number in the fourth random number set. Each of the first random number set, the second random number set, the third random number set, and the fourth random number set can include at least one random number that can be used to participate in MPC.

There can be a mapping relationship among random numbers in the first random number set, the second random number set, the third random number set, and the fourth random number set. In an example scenario, the first random number set can be $R1=\{<u_0>_1, \ldots, <u_0>_i, \ldots, <u_0>_k\}$, where $<u_0>_i$ represents an ith random number $u_0$ in the first random number set. The second random number set can be $R2=\{<v_0>_1, \ldots, <v_0>_i, \ldots, <v_0>_k\}$, where $<v_0>_i$ represents an ith random number $v_0$ in the second random number set. The third random number set can be $R3=\{<u_1>_1, \ldots, <u_1>_i, \ldots, <u_1>_k\}$, where $<u_1>_i$ represents an ith random number $u_1$ in the third random number set. The fourth random number set can be $R4=\{<v_1>_1, \ldots, <v_1>_i, \ldots, <v_1>_k\}$, where $<v_1>_i$ represents an ith random number $v_1$ in the fourth random number set. There can be a mapping relationship among $<u_0>_i$, $<v_0>_i$, $<u_1>_i$, and $<v_1>_i$, where i is a natural number greater than 0.

In some implementations, the first random number set can include one random number. Therefore, the random number server can generate one random number as the random number in the first random number set by using the agreed random number generation algorithm and using the first random seed as an initial condition. Alternatively, the first random number set can include a plurality of random numbers. Therefore, the random number server can perform iteration for a plurality of times by using the agreed random number generation algorithm and using the first random seed as an initial condition, to obtain a plurality of random numbers as the random numbers in the first random number set. The process of generating the second random number set, the third random number set, and the fourth random number set by the random number server can be similar to the process of generating the first random number set, and details are omitted here for simplicity.

S13: The random number server generates a fifth random number set and a sixth random number set respectively based on the first random number set, the second random number set, the third random number set, and the fourth random number set.

In some implementations, each of the fifth random number set and the sixth random number set can include at least one random number. There can be a mapping relationship among random numbers in the first random number set, the second random number set, the third random number set, the fourth random number set, the fifth random number set, and the sixth random number set. Referring back to the previous example scenario, the fifth random number set can be $R5=\{<z_0>_1, \ldots, <z_0>_i, \ldots, <z_0>_k\}$, where $<z_0>_i$ represents an ith random number $z_0$ in the fifth random number set. The sixth random number set can be $R6=\{<z_1>_1, \ldots, <z_1>_i, \ldots, <z_1>_k\}$, where $<z_1>_i$ represents an ith random number $z_1$ in the sixth random number set. There can be a mapping relationship among $<u_0>_i$, $<v_0>_i$, $<u_1>_i$, $<v_1>_i$, $<z_0>_i$, and $<z_1>_i$.

The random numbers in the first random number set, the second random number set, the third random number set, the fourth random number set, the fifth random number set, and the sixth random number set can satisfy a predetermined condition. Referring back to the previous example scenario, the predetermined condition can be $(<u_0>_i+<u_1>_i)(<v_0>_i+<v_1>_i)=<z_0>_i+<z_1>_i$.

In some implementations, the random number server can generate a fifth random number set; and the random number server can compute first data as a random number in the sixth random number set based on the first random number set, the second random number set, the third random number set, the fourth random number set, the fifth random number set, and the predetermined condition. Referring back to the previous example scenario, the random number server can generate a random number $<z_0>_i$ as a random number in the fifth random number set R5; and the random number server can compute first data $<z_1>_i$ as a random number in the sixth random number set R6 based on random numbers $<u_0>_i$, $<v_0>_i$, $<u_1>_i$, $<v_1>_i$, and $<z_0>_i$, and the predetermined condition $(<u_0>_i+<u_1>_i)(<v_0>_i+<v_1>_i)=<z_0>_i+<z_1>_i$.

Alternatively, the random number server can generate the sixth random number set; and the random number server can compute second data as a random number in the fifth random number set based on the first random number set, the second random number set, the third random number set, the fourth random number set, the sixth random number set, and the predetermined condition. Referring back to the previous example scenario, the random number server can generate a random number $<z_1>_i$ as a random number in the sixth random number set R6; and the random number server can compute second data $<z_0>_i$ as a random number in the fifth random number set R5 based on $<u_0>_i$, $<v_0>_i$, $<u_1>_i$, $<v_1>_i$, and $<z_1>_i$, the predetermined condition $(<u_0>_i+<u_1>_i)(<v_0>_i+<v_1>_i)=<z_0>_i+<z_1>_i$.

S15: The random number server sends the first random seed, the second random seed, and the fifth random number set to a first device.

In some implementations, the random number server can send the first random seed, the second random seed, and the fifth random number set to the first device. The first device can receive the first random seed, the second random seed, and the fifth random number set.

S17: The random number server sends the third random seed, the fourth random seed, and the sixth random number set to a second device.

In some implementations, the random number server can send the third random seed, the fourth random seed, and the sixth random number set to the second device. The second device can receive the third random seed, the fourth random seed, and the sixth random number set.

S19: The first device receives the first random seed, the second random seed, and the fifth random number set; and generates the first random number set and the second random number set based on the first random seed and the second random seed, respectively.

In some implementations, the first device can locally generate the first random number set and the second random number set by using an agreed random number generation algorithm and based on the first random seed and the second random seed, respectively.

S21: The second device receives the third random seed, the fourth random seed, and the sixth random number set; and generates the third random number set and the fourth random number set based on the third random seed and the fourth random seed, respectively.

In some implementations, the second device can locally generate the third random number set and the fourth random number set by using an agreed random number generation algorithm and based on the third random seed and the fourth random seed, respectively.

S23: The first device performs MPC based on the first random number set, the second random number set, and the fifth random number set; and the second device performs MPC based on the third random number set, the fourth random number set, and the sixth random number set.

In some implementations, the first random number set and the second random number set locally generated by the first device are respectively the same as the first random number set and the second random number set locally generated by the random number server, and the third random number set and the fourth random number set locally generated by the second device are respectively the same as the third random number set and the fourth random number set locally generated by the random number server. Therefore, random numbers in the first random number set locally generated by the first device, the second random number set locally generated by the first device, the third random number set locally generated by the second device, the fourth random number set locally generated by the second device, the fifth random number set locally generated by the random number server, and the sixth random number set locally generated by the random number server satisfy the previous predetermined condition. As such, the first device can perform MPC based on the first random number set, the second random number set, and the fifth random number set; and the second device can perform MPC based on the third random number set, the fourth random number set, and the sixth random number set.

Figure 4:
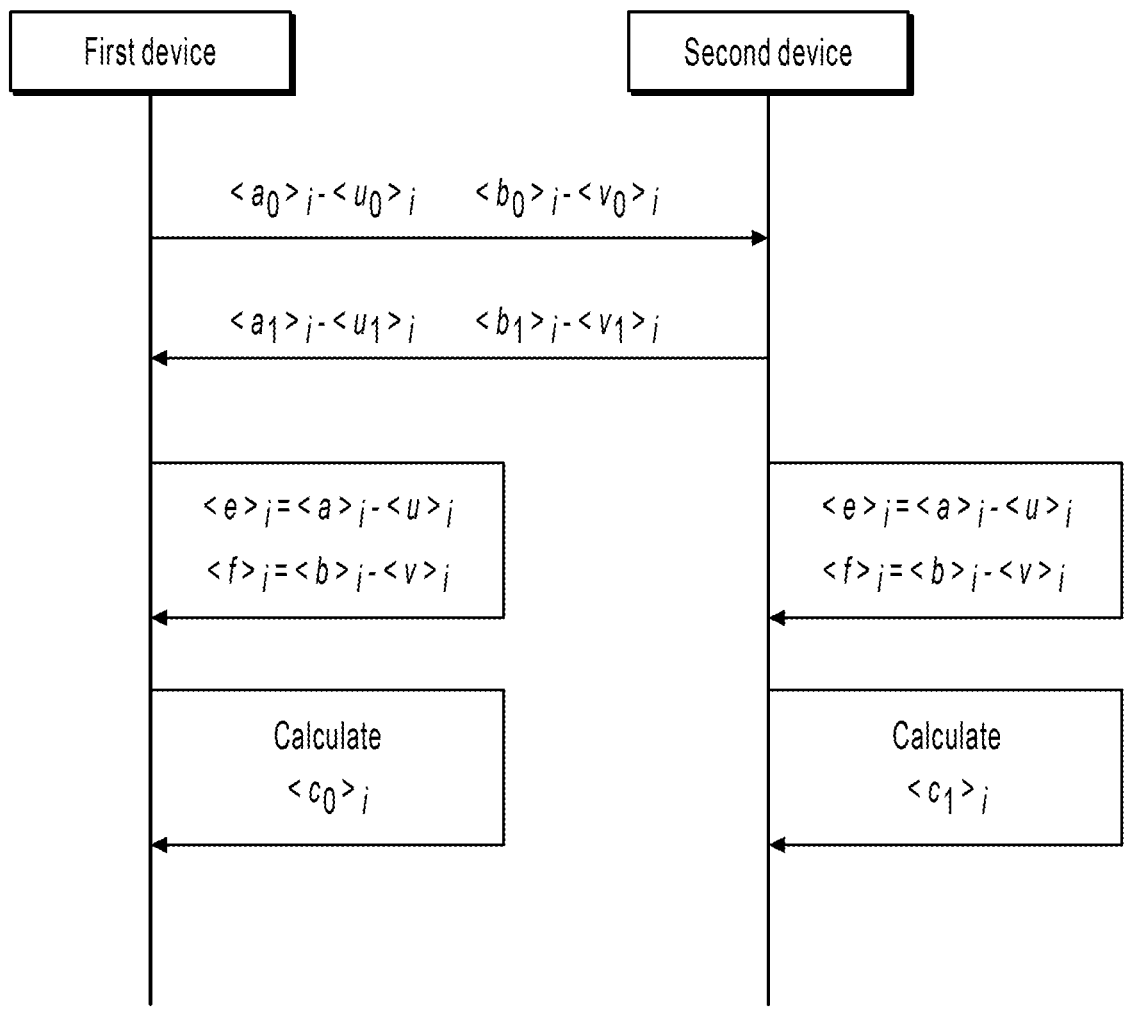
FIG. 4 is a schematic diagram illustrating a secret sharing process, according to an implementation of the present specification.

Secret sharing is an algorithm that is used to implement MPC. References are made to FIG. 4. The following describes an example scenario in which the first device and the second device performs secret sharing.

In the example scenario, the first device owns a first business dataset $D1=\{<a_0>_1, \ldots, <a_0>_i, \ldots, <a_0>_k\}$ and a second business dataset $D2=\{<b_0>_1, \ldots, <b_0>_i, \ldots, <b_0>_k\}$, where $<a_0>_i$ represents an ith piece of business data $a_1$ in the first business dataset, and $<b_1>_i$ represents an ith piece of business data $b_1$ in the second business dataset.

The second device owns a third business dataset $D3=\{<a_1>_1, \ldots, <a_1>_i, \ldots, <a_1>_k\}$ and a fourth business dataset $D4=\{<b_1>_1, \ldots, <b_1>_i, \ldots, <b_1>_k\}$, where $<a_1>_i$ represents an ith piece of business data $a_1$ in the third business dataset, and $<b_1>_i$ represents an ith piece of business data $b_1$ in the fourth business dataset.

$<a_0>_i$ can be understood as a share of business data $<a>_i$, and $<a_1>_i$ can be understood as another share of business data $<a>_i$, where $<a_0>_i+<a_1>_i=<a>_i$. Similarly, $<b_0>_i$ can be understood as a share of business data $<b>_i$, and $<b_1>_i$ can be understood as another share of business data $<b>_i$, where $<b_0>_i+<b_1>_i=<b>_i$.

In the example scenario, the first device can generate the first random number set $R1=\{<u_0>_1, \ldots, <u_0>_i, \ldots, <u_0>_k\}$ and the second random number set $R2=\{<v_0>_i, \ldots, <v_0>_i, \ldots, <v_0>_k\}$; and the first device can receive the fifth random number set $R5=\{<z_0>_1, \ldots, <z_0>_i, \ldots, <z_0>_k\}$ from the random number server.

The second device can generate the third random number set $R3=\{<u_1>_1, \ldots, <u_1>_i, \ldots, <u_1>_k\}$ and the fourth random number set $R4=\{<v_1>_1, \ldots, <v_1>_i, \ldots, <v_1>_k\}$; and the second device can receive the sixth random number $R6=\{<z_1>_i, \ldots, <z_1>_i, \ldots, <z_1>_k\}$ set from the random number server.

$<u_0>_i$, $<v_0>_i$, $<u_1>_i$, $<v_1>_i$, $<z_0>_i$, and $<z_1>_i$ represent the ith random numbers in the first random number set, the second random number set, the third random number set, the fourth random number set, the fifth random number set, and the sixth random number set, respectively. $<u_0>_i$, $<v_0>_i$, $<u_1>_i$, $<v_1>_i$, $<z_0>_i$, and $<z_1>_i$ satisfy the following predetermined condition: $(<u_0>_i+<u_1>_i)(<v_0>_i+<v_1>_i)=<z_0>_i+<z_1>_i$.

In the example scenario, the first device can secretly share a product $<a>_i \times <b>_i$ based on business data $<a_0>_i$, business data $<b_0>_i$, a random number $<u_0>_i$, a random number $<v_0>_i$, and a random number $<z_0>_i$; and the second device can secretly share the product $<a>_i \times <b>_i$ based on business data $<a_1>_i$, business data $<b_1>_i$, a random number $<u_1>_i$, a random number $<v_1>_i$, and a random number $<z_1>_i$. The first device can obtain a share $<c_1>_i$ of the product $<a>_i \times <b>_i$, and the second device can obtain another share $<c_0>_i$ of the product $<a>_i \times <b>_i$, where $<c_0>_i + <c_1>_i = <a>_i \times <b>_i = (<a_0>_i + <a_1>_i)(<b_0>_i + <b_1>_i)$. A specific process is as follows:

The first device can calculate $<a_0>_i - <u_0>_i$ and $<b_0>_i - <v_0>_i$, and can send $<a_0>_i - <u_0>_i$ and $<b_0>_i - <v_0>_i$ to the second device. The second device can receive $<a_0>_i - <u_0>_i$ and $<b_0>_i - <v_0>_i$.

The second device can calculate $<a_1>_i - <u_1>_i$ and $<b_1>_i - <v_1>_i$, and can send $<a_1>_i - <u_1>_i$ and $<b_1>_i - <v_1>_i$ to the first device. The first device can receive $<a_1>_i - <u_1>_i$ and $<b_1>_i - <v_1>_i$.

The first device can calculate $<e>_i = (<a_0>_i - <u_0>_i) + (<a_1>_i - <u_1>_i) = (<a_0>_i + <a_1>_i) - (<u_0>_i + <u_1>_i) = <a>_i - <u>_i$ and $<f>_i = (<b_0>_i - <v_0>_i) + (<b_1>_i - <v_1>_i) = (<b_0>_i + <b_1>_i) - (<v_0>_i + <v_1>_i) = <b>_i - <v>_i$. The second device can calculate $<e>_i = (<a_0>_i - <u_0>_i) + (<a_1>_i - <u_1>_i) = (<a_0>_i + <a_1>_i) - (<u_0>_i + <u_1>_i) = <a>_i - <u>_i$ and $<f>_i = (<b_0>_i - <v_0>_i) + (<b_1>_i - <v_1>_i) = (<b_0>_i + <b_1>_i) - (<v_0>_i + <v_1>_i) = <b>_i - <v>_i$. As such, both the first device and the second device obtain $<e>_i$ and $<f>_i$.

The first device can calculate $<c_0>_i = -<e>_i \times <f>_i + <a_0>_i \times <f>_i + <e>_i \times <b_0>_i + <z_0>_i$. The second device can calculate $<c_1>_i = <a_1>_i \times <f>_i + <e>_i \times <b_1>_i + <z_1>_i$. As such, secret sharing is implemented.

According to the data exchange method in the implementations of the present specification, the random number server can send the first random seed and the second random seed to the first device, and can send the third random seed and the fourth random seed to the second device. The random number server sends the random seeds to the first device and the second device, thereby reducing the number of sent random numbers and reducing network bandwidth occupation.

The following describes an example application scenario of an implementation of the present specification. It is worthwhile to note that, the example application scenario is merely intended to better describe the implementations of the present specification, and does not constitute an undue limitation on the implementations of the present specification.

In the cooperative security modeling scenario, for the sake of protecting data privacy, a plurality of data parties can cooperatively train the data processing model based on their own data without leaking their own data. The data processing model includes but is not limited to the logistic regression model, the linear regression model, the neural network model, etc. In the process of training the data processing model, the model parameters of the data processing model can be optimized and adjusted by using a model parameter optimization method. The model parameter optimization method can include the gradient descent method, the Newton method, etc. In a cooperative security modeling scenario, the data that is used to train the data processing model is scattered among data parties of cooperative modeling. Therefore, in the cooperative security modeling scenario, the model parameter optimization method can be implemented by using the secret sharing algorithm.

Usually, a third party can send the first random number set, the second random number set, and the fifth random number set to the first device; and the third party can send the third random number set, the fourth random number set, and the sixth random number set to the second device. The random numbers in the first random number set, the second random number set, the third random number set, the fourth random number set, the fifth random number set, and the sixth random number set can satisfy a predetermined condition. As such, the first device can implement the model parameter optimization method by using the secret sharing algorithm based on the first random number set, the second random number set, and the fifth random number set; and the second device can implement the model parameter optimization method by using the secret sharing algorithm based on the third random number set, the fourth random number set, and the sixth random number set, thereby optimizing and adjusting the model parameters of the data processing model. However, the third party needs to send the first random number set, the second random number set, and the fifth random number set to the first device; and needs to send the third random number set, the fourth random number set, and the sixth random number set to the second device. Consequently, the number of random numbers sent by the third party is large, and a large amount of network bandwidth is occupied.

According to the data exchange method in the previous implementations of the present specification, the problem of large network bandwidth occupation can be solved. The third party can send the first random seed, the second random seed, and the fifth random number set to the first device; and the third party can send the third random seed, the fourth random seed, and the sixth random number set to the second device. The first device can receive the first random seed, the second random seed, and the fifth random number set; and the first device can generate the first random number set and the second random number set based on the first random seed and the second random seed, respectively. The second device can receive the third random seed, the fourth random seed, and the sixth random number set; and the second device can generate the third random number set and the fourth random number set based on the third random seed and the fourth random seed, respectively. As such, the first device can implement the model parameter optimization method by using the secret sharing algorithm based on the first random number set, the second random number set, and the fifth random number set; and the second device can implement the model parameter optimization method by using the secret sharing algorithm based on the third random number set, the fourth random number set, and the sixth random number set, thereby optimizing and adjusting the model parameters of the data processing model. The third party sends the random seeds to the first device and the second device, thereby reducing the number of sent random numbers and reducing network bandwidth occupation.

Figure 5:
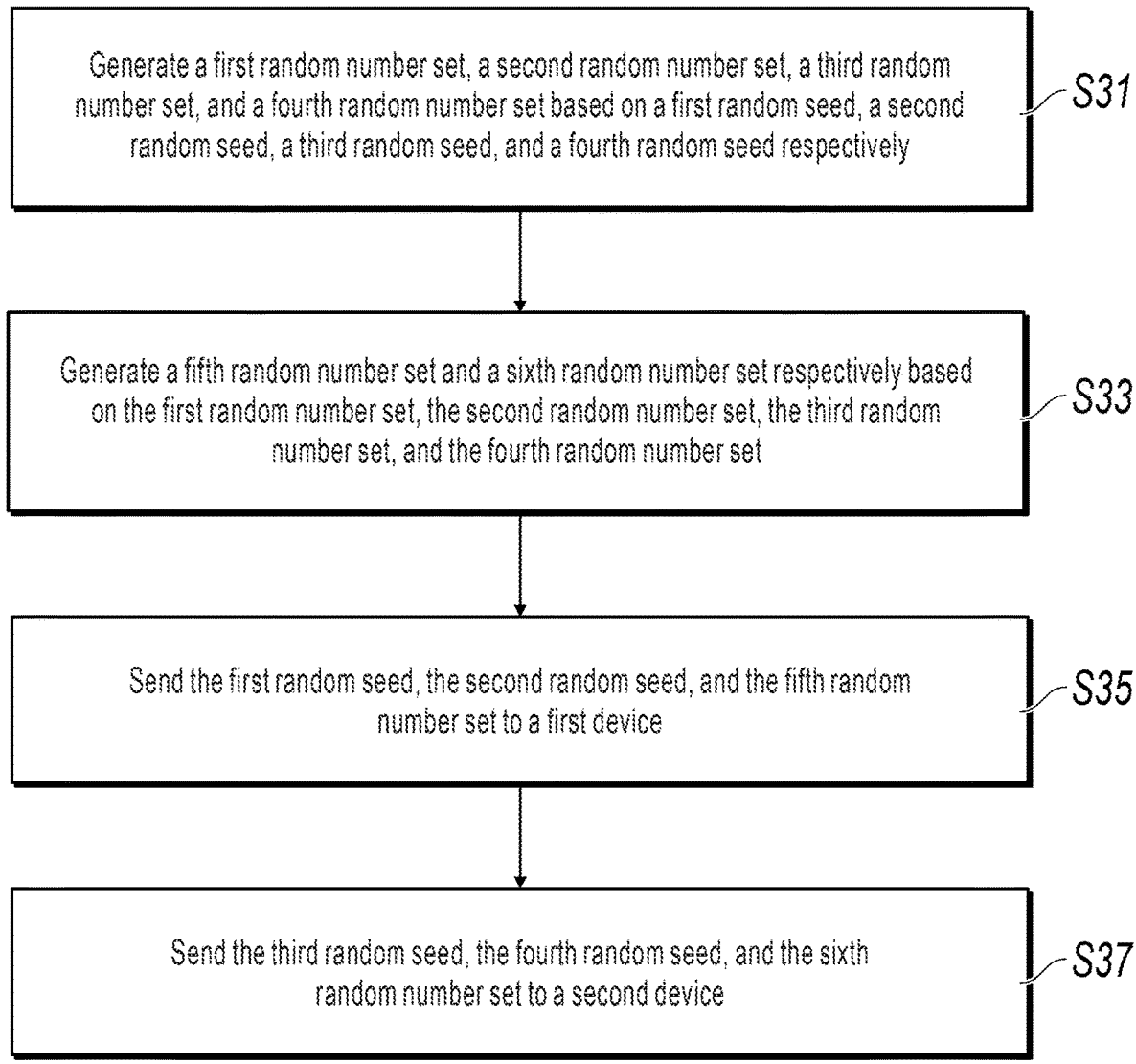
FIG. 5 is a flowchart illustrating a data exchange method, according to an implementation of the present specification.

Based on the same inventive concept, the present specification further provides another implementation of a data exchange method. References are made to FIG. 5. The present implementation can be applied to a random number server and can include the following steps.

S31: Generate a first random number set, a second random number set, a third random number set, and a fourth random number set based on a first random seed, a second random seed, a third random seed, and a fourth random seed respectively.

In some implementations, the first random seed, the second random seed, the third random seed, and the fourth random seed can be generated by the random number server, or can be sent by other electronic devices. The first random seed can be used to generate a random number in the first random number set, the second random seed can be used to generate a random number in the second random number set, the third random seed can be used to generate a random number in the third random number set, and the fourth random seed can be used to generate a random number in the fourth random number set. Each of the first random number set, the second random number set, the third random number set, and the fourth random number set can include at least one random number. There can be a mapping relationship among random numbers in the first random number set, the second random number set, the third random number set, and the fourth random number set.

In some implementations, the first random number set can include one random number. Therefore, the random number server can generate one random number as the random number in the first random number set by using the agreed random number generation algorithm and using the first random seed as an initial condition. Alternatively, the first random number set can include a plurality of random numbers. Therefore, the random number server can perform iteration for a plurality of times by using the agreed random number generation algorithm and using the first random seed as an initial condition, to obtain a plurality of random numbers as the random numbers in the first random number set. The process of generating the second random number set, the third random number set, and the fourth random number set by the random number server can be similar to the process of generating the first random number set, and details are omitted here for simplicity.

S33: Generate a fifth random number set and a sixth random number set respectively based on the first random number set, the second random number set, the third random number set, and the fourth random number set.

In some implementations, each of the fifth random number set and the sixth random number set can include at least one random number. There can be a mapping relationship among random numbers in the first random number set, the second random number set, the third random number set, the fourth random number set, the fifth random number set, and the sixth random number set.

The random numbers in the first random number set, the second random number set, the third random number set, the fourth random number set, the fifth random number set, and the sixth random number set can satisfy a predetermined condition.

In some implementations, the random number server can generate a fifth random number set; and the random number server can compute first data as a random number in the sixth random number set based on the first random number set, the second random number set, the third random number set, the fourth random number set, the fifth random number set, and the predetermined condition.

Alternatively, the random number server can generate the sixth random number set; and the random number server can compute second data as a random number in the fifth random number set based on the first random number set, the second random number set, the third random number set, the fourth random number set, the sixth random number set, and the predetermined condition.

S35: Send the first random seed, the second random seed, and the fifth random number set to a first device.

In some implementations, the random number server can send the first random seed and the second random seed to the first device, so that the first device generates a first random number set and a second random number set based on the first random seed and the second random seed respectively.

In some implementations, the first device can locally generate a first random number set and a second random number set based on the first random seed and the second random seed respectively; and the first device can perform MPC with the second device based on the first random number set, the second random number set, and the fifth random number set.

S37: Send the third random seed, the fourth random seed, and the sixth random number set to a second device.

In some implementations, the random number server can send the third random seed and the fourth random seed to the second device, so that the second device generates a third random number set and a fourth random number set based on the third random seed and the fourth random seed respectively.

In some implementations, the second device can locally generate a third random number set and a fourth random number set based on the third random seed and the fourth random seed respectively; and the second device can perform MPC with the first device based on the third random number set, the fourth random number set, and the sixth random number set.

According to the data exchange method in the implementations of the present specification, the random number server sends the random seeds to the first device and the second device, thereby reducing the number of sent random numbers and reducing network bandwidth occupation.

Figure 6:
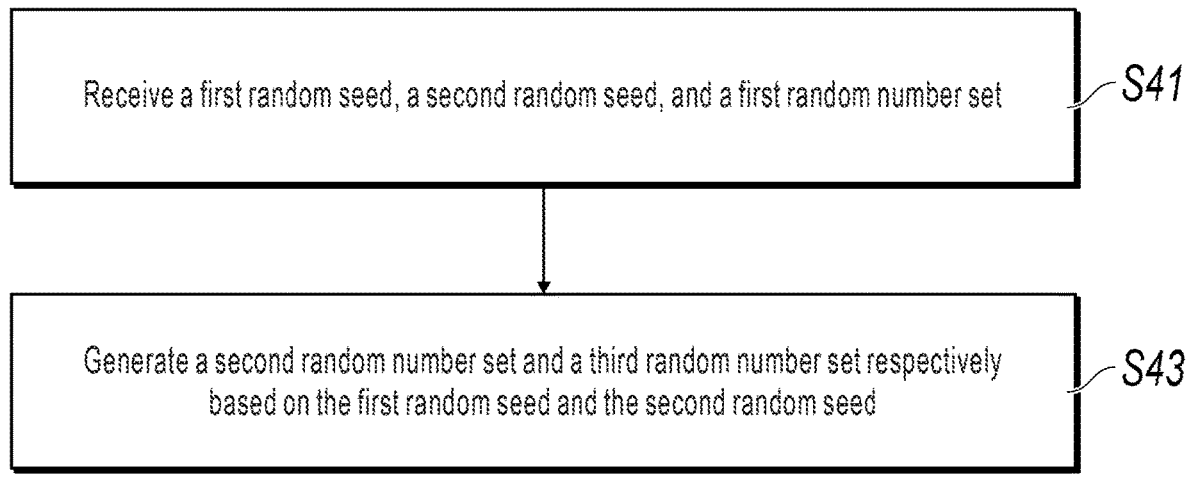
FIG. 6 is a flowchart illustrating a data exchange method, according to an implementation of the present specification.

Based on the same inventive concept, the present specification further provides another implementation of a data exchange method. References are made to FIG. 6. The present implementation can be applied to an electronic device, and the electronic device can include a first device and a second device. The implementation can include the following steps.

S41: Receive a first random seed, a second random seed, and a first random number set.

In some implementations, a random number server can send the first random seed, the second random seed, and the first random number set to the electronic device. The electronic device can receive the first random seed, the second random seed, and the first random number set from the random number server.

S43: Generate a second random number set and a third random number set respectively based on the first random seed and the second random seed.

In some implementations, a random number generation algorithm can be agreed on between the random number server and the electronic device. The electronic device can generate the second random number set and the third random number set by using the agreed random number generation algorithm based on the first random seed and the second random seed respectively, so that MPC is performed based on the first random number set, the second random number set, and the third random number set.

According to the data exchange method in the implementations of the present specification, the electronic device can receive the first random seed, the second random seed, and the first random number set sent by the random number server; and the electronic device can generate the second random number set and the third random number set based on the first random seed and the second random seed respectively, so that MPC is performed based on the first random number set, the second random number set, and the third random number set.

Figure 7:
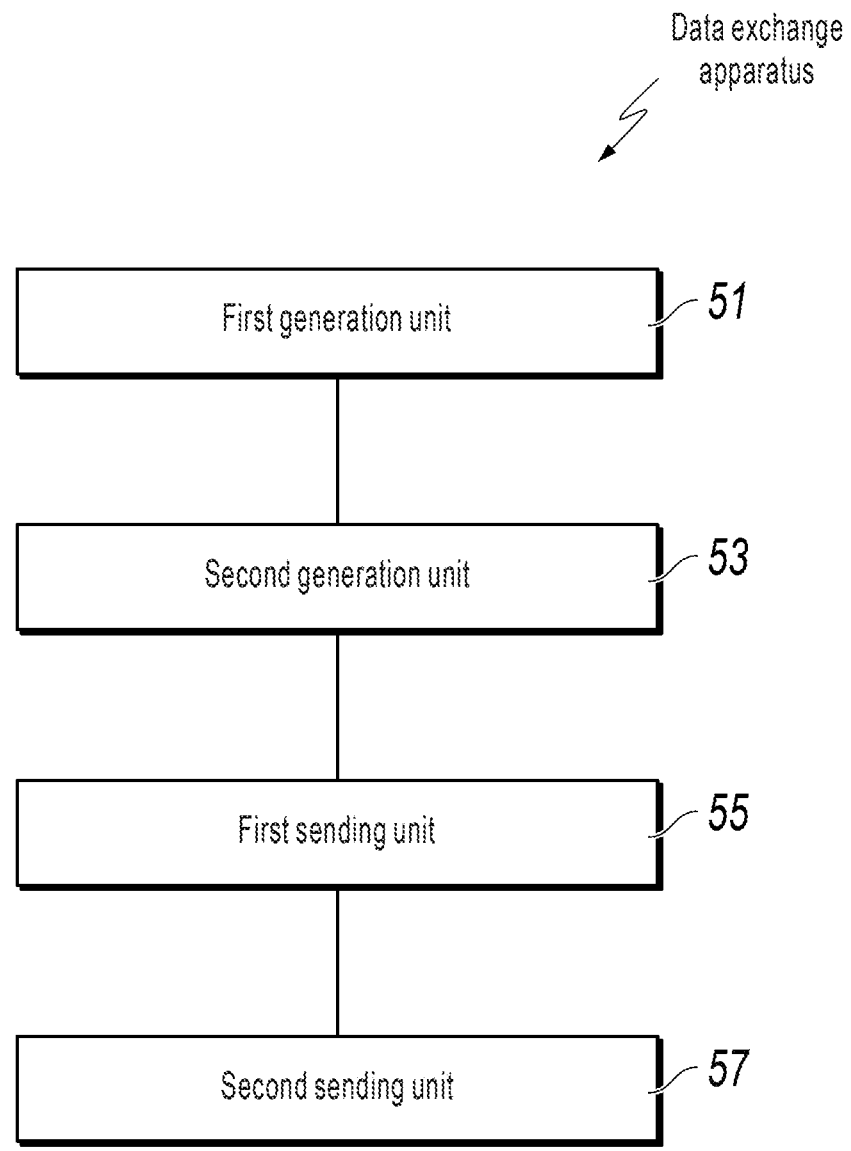
FIG. 7 is a functional structure diagram illustrating a data exchange apparatus, according to an implementation of the present specification.

References are made to FIG. 7. The present specification further provides an implementation of a data exchange apparatus. The implementation can be applied to a random number server and can include the following units: a first generation unit 51, configured to successively generate a first random number set, a second random number set, a third random number set, and a fourth random number set based on a first random seed, a second random seed, a third random seed, and a fourth random seed respectively; a second generation unit 53, configured to generate a fifth random number set and a sixth random number set respectively based on the first random number set, the second random number set, the third random number set, and the fourth random number set, where random numbers in the first random number set, the second random number set, the third random number set, the fourth random number set, the fifth random number set, and the sixth random number set satisfy a predetermined condition; a first sending unit 55, configured to send the first random seed, the second random seed, and the fifth random number set to a first device; and a second sending unit 57, configured to send the third random seed, the fourth random seed, and the sixth random number set to a second device.

Figure 8:
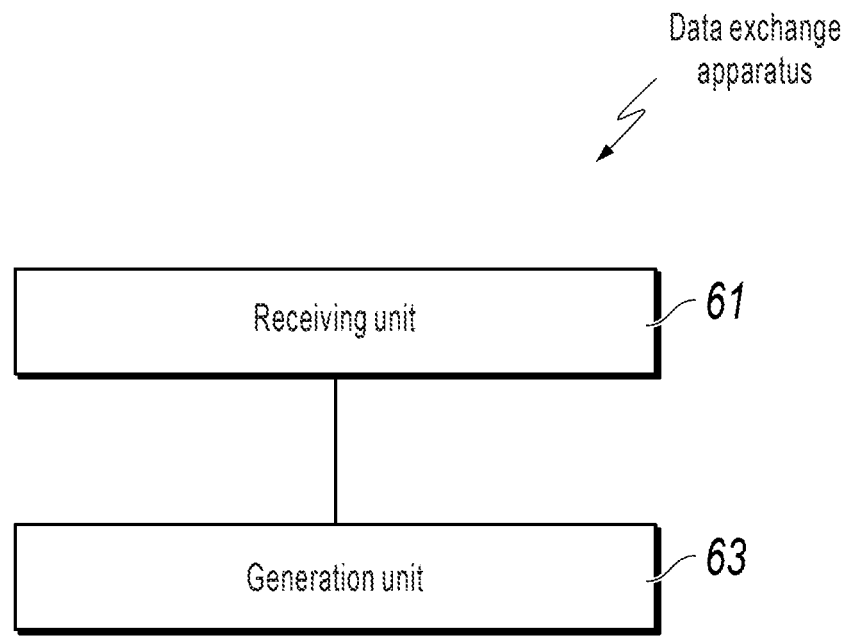
FIG. 8 is a functional structure diagram illustrating a data exchange apparatus, according to an implementation of the present specification.

References are made to FIG. 8. The present specification further provides an implementation of a data exchange apparatus. The implementation can be applied to an electronic device and can include the following units: a receiving unit 61, configured to receive a first random seed, a second random seed, and a first random number set; and a generation unit 63, configured to generate a second random number set and a third random number set based on the first random seed and the second random seed respectively, so that MPC is performed based on the first random number set, the second random number set, and the third random number set.

Figure 9:
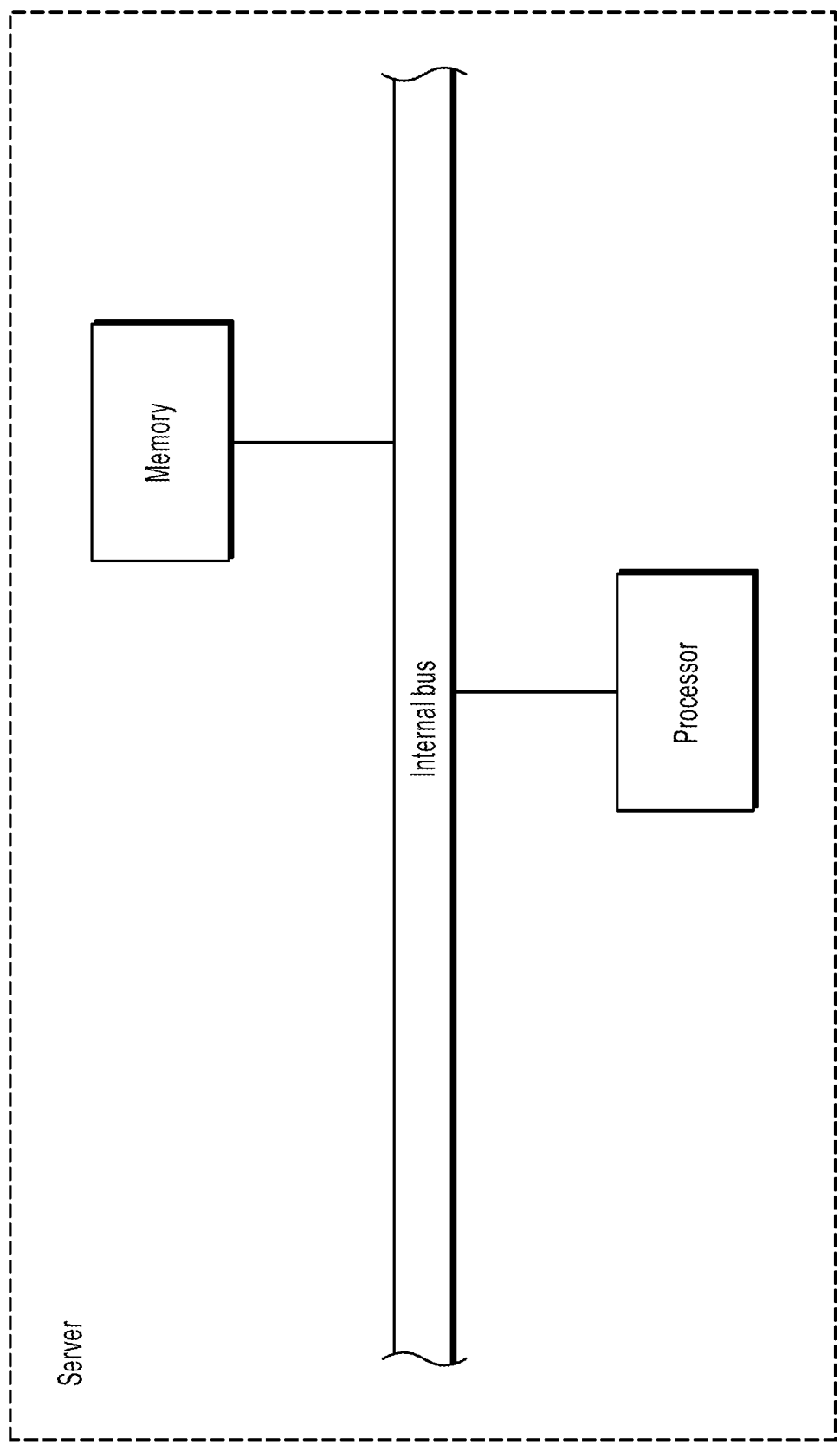
FIG. 9 is a functional structure diagram illustrating a server, according to an implementation of the present specification.

References are made to FIG. 9. An implementation of the present specification further provides a server. The server can include a memory and a processor.

In the present implementation, the memory includes but is not limited to a dynamic random access memory (DRAM), a static random access memory (SRAM), etc. The memory can be configured to store a computer instruction.

In the present implementation, the processor can be implemented in any appropriate way. For example, the processor can take the form of, for example, a microprocessor or processor, a computer readable medium storing computer readable program code (such as software or firmware) executable by the microprocessor or processor, a logic gate, a switch, an application specific integrated circuit (ASIC), a programmable logic controller, and an embedded microcontroller. The processor can be configured to execute the computer instruction to implement the implementation corresponding to FIG. 3.

Figure 10:
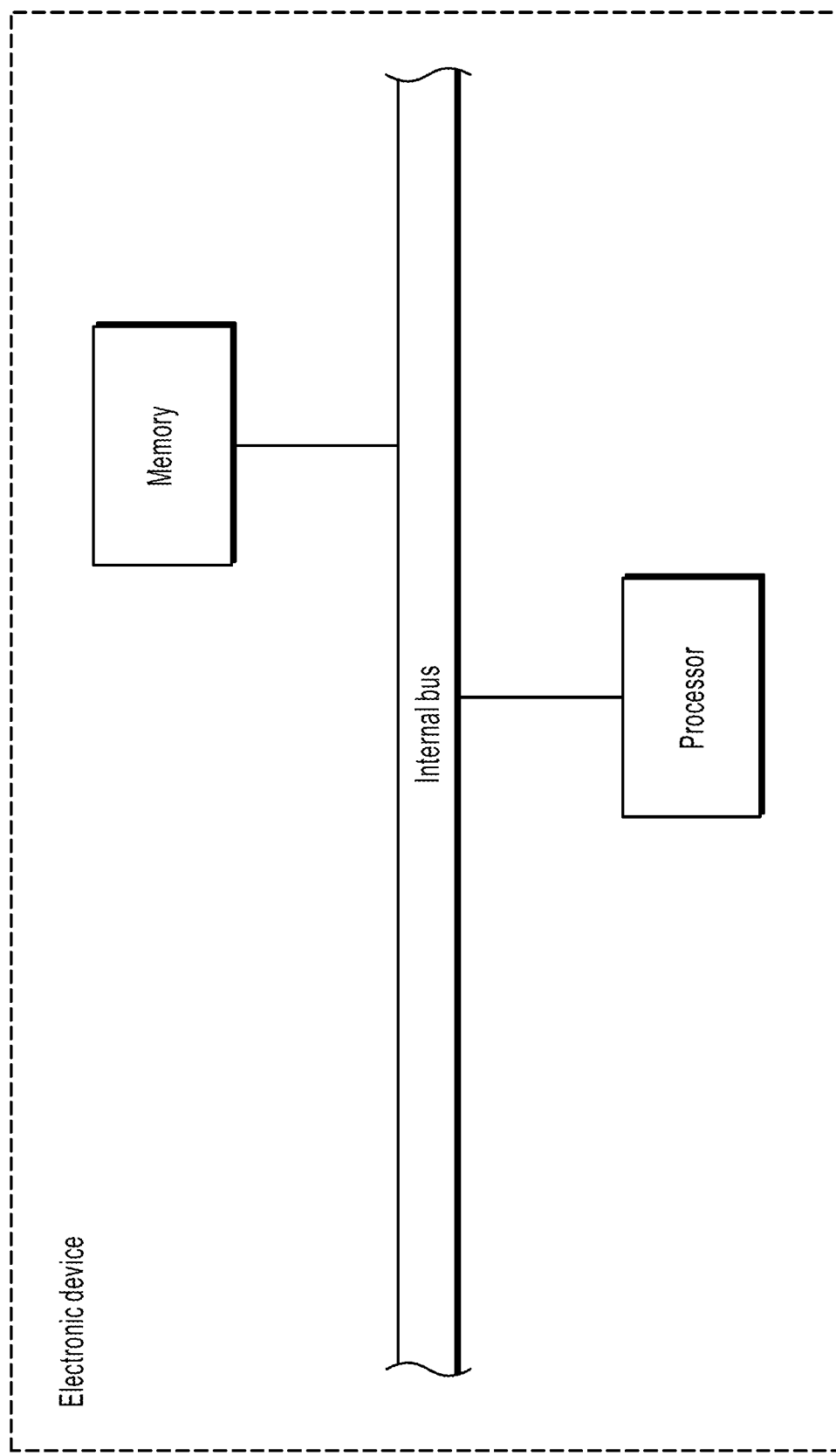
FIG. 10 is a functional structure diagram illustrating an electronic device, according to an implementation of the present specification.

References are made to FIG. 10. An implementation of the present specification further provides an electronic device. The electronic device can include a memory and a processor.

In the present implementation, the memory includes but is not limited to a DRAM, an SRAM, etc. The memory can be configured to store a computer instruction.

In the present implementation, the processor can be implemented in any appropriate way. For example, the processor can take the form of, for example, a microprocessor or processor, a computer readable medium storing computer readable program code (such as software or firmware) executable by the microprocessor or processor, a logic gate, a switch, an ASIC, a programmable logic controller, and an embedded microcontroller. The processor can be configured to execute the computer instruction to implement the implementation corresponding to FIG. 4.

It is worthwhile to note that the implementations in the present specification are progressively described, for the same or similar parts in the implementations, references can be made to each other, and each implementation focuses on a difference from other implementations. In particular, the apparatus implementation, the server implementation, and the electronic device implementation are basically similar to the data exchange method implementation, and therefore are described briefly; for related parts, references can be made to the related descriptions in the data exchange method implementation.

In addition, it can be understood that, after reading the present specification document, a person skilled in the art can figure out any combination of some or all of the implementations enumerated in the present specification without creative efforts, and these combinations also fall within the disclosure and protection scopes of the present specification.

In the 1990s, whether a technical improvement is a hardware improvement (for example, an improvement to a circuit structure, such as a diode, a transistor, or a switch) or a software improvement (an improvement to a method procedure) can be distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler that is used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the more than one described hardware description languages and is programmed into an integrated circuit.

The system, apparatus, module, or unit illustrated in the previous implementations of the present specification can be implemented by using a computer chip or an entity, or can be implemented by using a product having a certain function. A typical implementation device is a computer. The computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

It can be seen from the descriptions of the implementations that a person skilled in the art can understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes more than one instructions for instructing a computer device (can be a personal computer, a server, or a network device) to perform the methods described in the implementations or in some parts of the implementations of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable consumer electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A computer-implemented data exchange method for secure multi-party computation (MPC), comprising:
generating, by a server, a first random number set, a second random number set, a third random number set, and a fourth random number set based on a first random seed, a second random seed, a third random seed, and a fourth random seed, respectively;
generating, by the server, a fifth random number set and a sixth random number set, respectively, based on the first random number set, the second random number set, the third random number set, and the fourth random number set, wherein random numbers in the first random number set, the second random number set, the third random number set, the fourth random number set, the fifth random number set, and the sixth random number set satisfy a predetermined condition;
sending, by the server, the first random seed, the second random seed, and the fifth random number set to a first device; and
sending, by the server, the third random seed, the fourth random seed, and the sixth random number set to a second device.

2. The computer-implemented method of claim 1, wherein the predetermined condition satisfied by the random numbers in the first random number set, the second random number set, the third random number set, the fourth random number set, the fifth random number set, and the sixth random number set comprises:

$$(<u_0>_i+<u_1>_i)(<v_0>_i+<v_1>_i)=<z_0>_i+<z_1>_i, \text{ wherein}$$

$<u_0>_i$ represents an ith random number $u_0$ in the first random number set, $<u_1>_i$ represents an ith random number $u_1$ in the third random number set, $<v_0>_i$ represents an ith random number $v_0$ in the second random number set, $<v_1>_i$ represents an ith random number $v_1$ in the fourth random number set, $<z_0>_i$ represents an ith random number $z_0$ in the fifth random number set, $<z_1>_i$ represents an ith random number $z_1$ in the sixth random number set, and i is a natural number greater than zero.

3. The computer-implemented method of claim 1, wherein generating the fifth random number set and the sixth random number set, respectively, based on the first random number set, the second random number set, the third random number set, and the fourth random number set comprises:
generating the fifth random number set and computing first data as a random number in the sixth random number set based on the first random number set, the second random number set, the third random number set, the fourth random number set, the fifth random number set, and the predetermined condition; or
generating the sixth random number set and computing second data as a random number in the fifth random number set based on the first random number set, the second random number set, the third random number set, the fourth random number set, the sixth random number set, and the predetermined condition.

4. The computer-implemented method of claim 1, wherein:
sending the first random seed, the second random seed, and the fifth random number set to the first device comprises:
sending the first random seed, the second random seed, and the fifth random number set to the first device, wherein the first device generates the first random number set and the second random number set based on the first random seed and the second random seed, and the first device performs MPC based on the first random number set, the second random number set, and the fifth random number set; and
sending the third random seed, the fourth random seed, and the sixth random number set to the second device comprises:
sending the third random seed, the fourth random seed, and the sixth random number set to the second device, wherein the second device generates the third random number set and the fourth random number set based on the third random seed and the fourth random seed, and the second device performs MPC based on the third random number set, the fourth random number set, and the sixth random number set.

5. The computer-implemented method of claim 1, wherein:
the first random seed, the second random seed, the third random seed, and the fourth random seed are all MPC random seeds; and
each of the first random number set, the second random number set, the third random number set, the fourth random number set, the fifth random number set, and the sixth random number set includes at least one random number that is used to participate in MPC.

6. A non-transitory, computer-readable medium storing one or more instructions executable by a computer system to perform operations comprising:
generating a first random number set, a second random number set, a third random number set, and a fourth random number set based on a first random seed, a second random seed, a third random seed, and a fourth random seed, respectively;
generating a fifth random number set and a sixth random number set, respectively, based on the first random number set, the second random number set, the third random number set, and the fourth random number set, wherein random numbers in the first random number set, the second random number set, the third random number set, the fourth random number set, the fifth random number set, and the sixth random number set satisfy a predetermined condition;
sending the first random seed, the second random seed, and the fifth random number set to a first device; and
sending the third random seed, the fourth random seed, and the sixth random number set to a second device.

7. The non-transitory, computer-readable medium of claim 6, wherein the predetermined condition satisfied by the random numbers in the first random number set, the second random number set, the third random number set, the fourth random number set, the fifth random number set, and the sixth random number set comprises:

$$(<u_0>_i+<u_1>_i)(<v_0>_i+<v_1>_i)=<z_0>_i+<z_1>_i, \text{ wherein}$$

$<u_0>_i$ represents an ith random number $u_0$ in the first random number set, $<u_1>_i$ represents an ith random number $u_1$ in the third random number set, $<v_0>_i$ represents an ith random number $v_0$ in the second random number set, $<v_1>_i$ represents an ith random number $v_1$ in the fourth random number set, $<z_0>_i$ represents an ith random number $z_0$ in the fifth random number set, $<z_1>_i$ represents an ith random number $z_1$ in the sixth random number set, and i is a natural number greater than zero.

8. The non-transitory, computer-readable medium of claim 6, wherein generating the fifth random number set and the sixth random number set, respectively, based on the first random number set, the second random number set, the third random number set, and the fourth random number set comprises:
generating the fifth random number set and computing first data as a random number in the sixth random number set based on the first random number set, the second random number set, the third random number set, the fourth random number set, the fifth random number set, and the predetermined condition; or
generating the sixth random number set and computing second data as a random number in the fifth random number set based on the first random number set, the second random number set, the third random number set, the fourth random number set, the sixth random number set, and the predetermined condition.

9. The non-transitory, computer-readable medium of claim 6, wherein:
sending the first random seed, the second random seed, and the fifth random number set to the first device comprises:
sending the first random seed, the second random seed, and the fifth random number set to the first device,
wherein the first device generates the first random number set and the second random number set based on the first random seed and the second random seed, and the first device performs MPC based on the first random number set, the second random number set, and the fifth random number set; and
sending the third random seed, the fourth random seed, and the sixth random number set to the second device comprises:
sending the third random seed, the fourth random seed, and the sixth random number set to the second device,
wherein the second device generates the third random number set and the fourth random number set based on the third random seed and the fourth random seed, and the second device performs MPC based on the third random number set, the fourth random number set, and the sixth random number set.

10. The non-transitory, computer-readable medium of claim 6, wherein:
the first random seed, the second random seed, the third random seed, and the fourth random seed are all MPC random seeds; and
each of the first random number set, the second random number set, the third random number set, the fourth random number set, the fifth random number set, and the sixth random number set includes at least one random number that is used to participate in MPC.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
generating a first random number set, a second random number set, a third random number set, and a fourth random number set based on a first random seed, a second random seed, a third random seed, and a fourth random seed, respectively;
generating a fifth random number set and a sixth random number set, respectively, based on the first random number set, the second random number set, the third random number set, and the fourth random number set, wherein random numbers in the first random number set, the second random number set, the third random number set, the fourth random number set, the fifth random number set, and the sixth random number set satisfy a predetermined condition;
sending the first random seed, the second random seed, and the fifth random number set to a first device; and
sending the third random seed, the fourth random seed, and the sixth random number set to a second device.

12. The computer-implemented system of claim 11, wherein the predetermined condition satisfied by the random numbers in the first random number set, the second random number set, the third random number set, the fourth random number set, the fifth random number set, and the sixth random number set comprises:

$$(<u_0>_i+<u_1>_i)(<v_0>_i+<v_1>_i)=<z_0>_i+<z_1>_i, \text{ wherein}$$

$<u_0>_i$ represents an ith random number $u_0$ in the first random number set, $<u_1>_i$ represents an ith random number $u_1$ in the third random number set, $<v_0>_i$ represents an ith random number $v_0$ in the second random number set, $<v_1>_i$ represents an ith random number $v_1$ in the fourth random number set, $<z_0>_i$ represents an ith random number $z_0$ in the fifth random number set, $<z_1>_i$ represents an ith random number $z_1$ in the sixth random number set, and i is a natural number greater than zero.

13. The computer-implemented system of claim 11, wherein generating the fifth random number set and the sixth random number set, respectively, based on the first random number set, the second random number set, the third random number set, and the fourth random number set comprises:

generating the fifth random number set and computing first data as a random number in the sixth random number set based on the first random number set, the second random number set, the third random number set, the fourth random number set, the fifth random number set, and the predetermined condition; or generating the sixth random number set and computing second data as a random number in the fifth random number set based on the first random number set, the second random number set, the third random number set, the fourth random number set, the sixth random number set, and the predetermined condition.

14. The computer-implemented system of claim 11, wherein:

sending the first random seed, the second random seed, and the fifth random number set to the first device comprises:

sending the first random seed, the second random seed, and the fifth random number set to the first device, wherein the first device generates the first random number set and the second random number set based on the first random seed and the second random seed, and the first device performs MPC based on the first random number set, the second random number set, and the fifth random number set; and sending the third random seed, the fourth random seed, and the sixth random number set to the second device comprises:

sending the third random seed, the fourth random seed, and the sixth random number set to the second device, wherein the second device generates the third random number set and the fourth random number set based on the third random seed and the fourth random seed, and the second device performs MPC based on the third random number set, the fourth random number set, and the sixth random number set.

15. The computer-implemented system of claim 11, wherein:

the first random seed, the second random seed, the third random seed, and the fourth random seed are all MPC random seeds; and each of the first random number set, the second random number set, the third random number set, the fourth random number set, the fifth random number set, and the sixth random number set includes at least one random number that is used to participate in MPC.

* * * * *